United States Patent
Pandit et al.

(10) Patent No.: US 12,079,158 B2
(45) Date of Patent: Sep. 3, 2024

(54) RECONFIGURABLE NEURAL ENGINE WITH EXTENSIBLE INSTRUCTION SET ARCHITECTURE

(71) Applicant: Xilinx, Inc., San Jose, CA (US)

(72) Inventors: Sanket Pandit, San Jose, CA (US); Jorn Tuyls, Leinster (IE); Xiao Teng, Cupertino, CA (US); Rajeev Patwari, San Jose, CA (US); Ehsan Ghasemi, San Jose, CA (US); Elliott Delaye, San Jose, CA (US); Aaron Ng, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/814,817

(22) Filed: Jul. 25, 2022

(65) Prior Publication Data
US 2024/0028556 A1    Jan. 25, 2024

(51) Int. Cl.
*G06F 15/76* (2006.01)
*G06F 9/455* (2018.01)
*G06F 15/80* (2006.01)

(52) U.S. Cl.
CPC ...... *G06F 15/8053* (2013.01); *G06F 9/45533* (2013.01)

(58) Field of Classification Search
CPC ............ G06F 15/8053; G06F 9/45533
See application file for complete search history.

(56) References Cited

U.S. PATENT DOCUMENTS

| | | |
|---|---|---|
| 3,776,137 A | 12/1973 | Abbott |
| 4,876,641 A | 10/1989 | Cowley |
| 6,091,263 A | 7/2000 | New et al. |
| 6,150,839 A | 11/2000 | New et al. |
| 6,204,687 B1 | 3/2001 | Schultz et al. |
| 6,462,579 B1 | 10/2002 | Camilleri et al. |
| 6,526,557 B1 | 2/2003 | Young et al. |
| 6,759,869 B1 | 7/2004 | Young et al. |
| 6,781,407 B2 | 8/2004 | Schultz |
| 6,810,514 B1 | 10/2004 | Alfke et al. |
| 6,836,842 B1 | 12/2004 | Guccione et al. |
| 6,907,595 B2 | 6/2005 | Curd et al. |
| 7,024,651 B1 | 4/2006 | Camilleri et al. |
| 7,057,413 B1 | 6/2006 | Young et al. |
| 7,124,338 B1 | 10/2006 | Mark et al. |

(Continued)

FOREIGN PATENT DOCUMENTS

| | | |
|---|---|---|
| WO | 2019195132 | 10/2019 |
| WO | 2019195309 | 10/2019 |
| WO | 2019195343 | 10/2019 |

OTHER PUBLICATIONS

Xilinx, Inc., "Xilinx AI Engines and Their Applications," WP506 (v1.1) Jul. 10, 2020, 13 pages.

(Continued)

*Primary Examiner* — Cheng Yuan Tseng

(74) *Attorney, Agent, or Firm* — Kevin T. Cuenot

(57) ABSTRACT

An integrated circuit includes a plurality of kernels and a virtual machine coupled to the plurality of kernels. The virtual machine is configured to interpret instructions directed to different ones of the plurality of kernels. The virtual machine is configured to control operation of the different ones of the plurality of kernels responsive to the instructions.

20 Claims, 8 Drawing Sheets

(56) References Cited

U.S. PATENT DOCUMENTS

| | | |
|---|---|---|
| 7,185,309 B1 | 2/2007 | Kulkarni et al. |
| 7,199,608 B1 | 4/2007 | Trimberger |
| 7,224,184 B1 | 5/2007 | Levi et al. |
| 7,281,093 B1 | 10/2007 | Kulkarni et al. |
| 7,301,822 B1 | 11/2007 | Walstrum, Jr. et al. |
| 7,302,625 B1 | 11/2007 | Payakapan et al. |
| 7,454,658 B1 | 1/2008 | Baxter |
| 7,328,335 B1 | 2/2008 | Sundararajan et al. |
| 7,380,035 B1 | 5/2008 | Donlin |
| 7,394,288 B1 | 7/2008 | Agarwal |
| 7,420,392 B2 | 9/2008 | Schultz et al. |
| 7,477,072 B1 | 1/2009 | Kao et al. |
| 7,478,357 B1 | 1/2009 | Mason et al. |
| 7,482,836 B2 | 1/2009 | Levi et al. |
| 7,500,060 B1 | 3/2009 | Anderson et al. |
| 7,509,617 B1 | 3/2009 | Young |
| 7,518,396 B1 | 4/2009 | Kondapalli et al. |
| 7,521,961 B1 | 4/2009 | Anderson |
| 7,539,845 B1 | 5/2009 | Wentzlaff et al. |
| 7,546,572 B1 | 6/2009 | Ballagh et al. |
| 7,574,680 B1 | 8/2009 | Kulkarni et al. |
| 7,576,561 B1 | 8/2009 | Huang |
| 7,619,442 B1 | 11/2009 | Mason et al. |
| 7,640,527 B1 | 12/2009 | Dorairaj et al. |
| 7,650,248 B1 | 1/2010 | Baxter |
| 7,653,820 B1 | 1/2010 | Trimberger |
| 7,689,726 B1 | 3/2010 | Sundararajan et al. |
| 7,724,815 B1 | 5/2010 | Raha et al. |
| 7,746,099 B1 | 6/2010 | Chan et al. |
| 7,774,579 B1 | 8/2010 | Wentzlaff |
| 7,788,625 B1 | 8/2010 | Donlin et al. |
| 7,831,801 B1 | 11/2010 | Anderson |
| 8,006,021 B1 | 8/2011 | Li et al. |
| 8,020,163 B2 | 9/2011 | Nollet et al. |
| 8,045,546 B1 | 10/2011 | Bao et al. |
| 8,102,188 B1 | 1/2012 | Chan et al. |
| 8,214,694 B1 | 7/2012 | McKechnie et al. |
| 8,250,342 B1 | 8/2012 | Kostamov et al. |
| 8,359,448 B1 | 1/2013 | Neuendorffer |
| 8,415,974 B1 | 4/2013 | Lysaght |
| 8,656,141 B1 | 2/2014 | Agarwal |
| 8,719,750 B1 | 5/2014 | Balzli, Jr. |
| 8,796,539 B2 | 8/2014 | Asaumi et al. |
| 8,928,351 B1 | 1/2015 | Konduru |
| 9,081,634 B1 | 7/2015 | Simkins et al. |
| 9,152,794 B1 | 10/2015 | Sanders et al. |
| 9,165,143 B1 | 10/2015 | Sanders et al. |
| 9,218,443 B1 | 12/2015 | Styles et al. |
| 9,230,112 B1 | 1/2016 | Peterson et al. |
| 9,323,876 B1 | 4/2016 | Lysaght et al. |
| 9,336,010 B2 | 5/2016 | Kochar et al. |
| 9,411,688 B1 | 8/2016 | Poolla et al. |
| 9,436,785 B1 | 9/2016 | Javre |
| 9,639,487 B1 | 5/2017 | Wentzlaff |
| 9,652,252 B1 | 5/2017 | Kochar et al. |
| 9,652,410 B1 | 5/2017 | Schelle et al. |
| 9,722,613 B1 | 8/2017 | Schultz et al. |
| 9,990,241 B2 | 6/2018 | Dobbs |
| 10,243,882 B1 | 3/2019 | Swarbrick |
| 10,505,548 B1 | 12/2019 | Swarbrick |
| 10,673,439 B1 | 6/2020 | Ahmad |
| 10,673,745 B2 | 6/2020 | Swarbrick |
| 10,747,690 B2 | 8/2020 | Bilski |
| 10,783,603 B2 * | 9/2020 | Venkatesh ............... G06T 1/60 |
| 10,802,807 B1 * | 10/2020 | Hsu ........................ G06F 8/433 |
| 10,824,505 B1 | 11/2020 | Swarbrick |
| 10,824,584 B1 | 11/2020 | Noguera Serra |
| 10,838,908 B2 | 11/2020 | Swarbrick |
| 10,866,753 B2 | 12/2020 | Noguera Serra et al. |
| 10,909,418 B2 * | 2/2021 | Lee ................... G06F 18/2113 |
| 10,963,421 B1 | 3/2021 | Swarbrick |
| 11,113,030 B1 * | 9/2021 | Monga ..................... G06F 8/10 |
| 11,163,605 B1 * | 11/2021 | Santan ............... G06F 15/7807 |
| 11,204,745 B2 * | 12/2021 | Gupta .................... G06F 8/451 |
| 11,204,976 B2 * | 12/2021 | Ross ..................... G06F 17/153 |
| 11,263,064 B2 * | 3/2022 | Gangani ............... G06F 9/4881 |
| 11,531,873 B2 * | 12/2022 | Boesch .................. G06F 9/5027 |
| 11,593,547 B1 * | 2/2023 | Petrica ................... G06F 30/34 |
| 11,620,491 B2 * | 4/2023 | Wang ....................... G06N 3/08 |
| | | 706/27 |
| 11,809,514 B2 * | 11/2023 | Ross ..................... G06F 7/5443 |
| 2004/0114609 A1 | 6/2004 | Swarbrick et al. |
| 2004/0210695 A1 | 10/2004 | Weber et al. |
| 2007/0006137 A1 | 1/2007 | Savagaonkar |
| 2007/0124565 A1 | 5/2007 | Jones |
| 2008/0082759 A1 | 4/2008 | Pong |
| 2008/0320255 A1 | 12/2008 | Wingard et al. |
| 2008/0320268 A1 | 12/2008 | Wingard et al. |
| 2012/0036296 A1 | 2/2012 | Wingard et al. |
| 2012/0310983 A1 | 12/2012 | Mittal |
| 2014/0006751 A1 | 1/2014 | Aliseychik et al. |
| 2014/0267334 A1 | 9/2014 | Duluk, Jr. |
| 2016/0011996 A1 | 1/2016 | Asaad et al. |
| 2017/0140800 A1 | 5/2017 | Wingard et al. |
| 2017/0220499 A1 | 8/2017 | Gray |
| 2017/0315944 A1 | 11/2017 | Mayer et al. |
| 2018/0012637 A1 | 1/2018 | Krishna |
| 2019/0155666 A1 | 5/2019 | Dobbs |
| 2019/0205263 A1 | 7/2019 | Fleming |
| 2019/0205269 A1 | 7/2019 | Fleming, Jr. |
| 2019/0238453 A1 | 8/2019 | Swarbrick et al. |
| 2019/0266125 A1 | 8/2019 | Swarbrick et al. |
| 2019/0303033 A1 | 10/2019 | Noguera Serra et al. |
| 2019/0303311 A1 | 10/2019 | Bilski et al. |
| 2019/0303323 A1 | 10/2019 | Swarbrick et al. |
| 2019/0303328 A1 | 10/2019 | Bilski et al. |
| 2020/0234124 A1 * | 7/2020 | Park ....................... G06N 3/048 |
| 2020/0311617 A1 | 10/2020 | Swan |
| 2022/0092736 A1 * | 3/2022 | Liu ........................ G06T 1/20 |
| 2022/0197854 A1 | 6/2022 | Aal ........................ G06F 30/34 |
| 2022/0207656 A1 * | 6/2022 | Yao ....................... G06N 3/045 |
| 2022/0284271 A1 * | 9/2022 | Park ..................... G06F 11/3062 |
| 2022/0343137 A1 * | 10/2022 | Surendran ............. G06N 3/063 |
| 2023/0039180 A1 * | 2/2023 | Luitjens ................ G06F 9/4484 |
| 2023/0050061 A1 * | 2/2023 | Havlir ................... G06F 9/5044 |
| 2023/0083345 A1 * | 3/2023 | Kelur ...................... G06N 5/04 |
| | | 706/21 |
| 2023/0099608 A1 * | 3/2023 | Venkataramani ....... G06N 3/065 |
| | | 706/15 |
| 2023/0185873 A1 * | 6/2023 | Espig ..................... G06F 17/16 |
| | | 708/420 |
| 2023/0205559 A1 * | 6/2023 | Chowdhury ............. G06T 1/20 |
| | | 713/1 |
| 2023/0291406 A1 * | 9/2023 | Cochell ............ H03K 19/17756 |
| 2024/0028556 A1 * | 1/2024 | Pandit ....................... G06F 9/30 |

OTHER PUBLICATIONS

Xilinx, Inc., "Versal: The First Adaptive Compute Acceleration Platform (ACAP)," WP505 (v1.1.1) Sep. 29, 2020, 21 pages.

Han Shenquan et al: "An approach to improving the performance of CUDA in virtual. environment", 2016 17th IEEE/ACIS International Conference on so~~ Engineering,. Artificial Intelligence, Networking and Parallel/Distributed Computing (SNPD), IEEE, May 30, 2016 (May 30, 2016), pp. 585-590.

\* cited by examiner

RECONFIGURABLE NEURAL ENGINE WITH EXTENSIBLE INSTRUCTION SET ARCHITECTURE

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to artificial neural networks and, more particularly, to a reconfigurable neural engine with an extensible instruction set architecture for implementing artificial neural networks in integrated circuits.

BACKGROUND

Deep learning refers to a subset of machine learning. To accomplish a given task, deep learning utilizes artificial neural networks. An artificial neural network, or simply a "neural network," includes layers of interconnected nodes that are operable to categorize input data into categories of interest. In general, a neural network will include an input layer and an output layer and optionally one or more hidden layers between the input and output layers. A neural network expressed as a machine learning model used in deep learning applications typically includes many hidden layers, which gives rise to the term "deep neural network."

A machine learning model may be developed that specifies a particular neural network. Inference refers to calculating an output of the machine learning model given input data. Because of the high degree of computational intensity involved in performing inference, significant development effort has been devoted to executing machine learning models with greater efficiency across different hardware platforms (e.g., central processing units, graphics processing units, field programmable gate arrays, digital signal processors, and application-specific integrated circuits).

In some cases, a machine learning model is implemented by spatially partitioning fixed-function kernels onto available hardware resources of the hardware platform. In general, a kernel refers to a design unit that performs an operation in a machine learning model. For example, a kernel may perform a function such as general matrix multiply, aggregation, pooling, or activation. Spatially partitioning kernels onto a hardware platform consumes significant time and, upon completion, still may result in a placement and routing of the fixed-function kernels onto the hardware platform that results in performance bottlenecks.

In other cases, developers create hand-tuned kernels that are spatially partitioned onto the available hardware resources of the hardware platform. Creating hand-tuned kernels is also a time consuming and error-prone endeavor. The hand-tuned kernels may be incompatible with other machine learning models and are often coded at a low-level to be able to efficiently utilize the hardware resources of the underlying hardware platform. This can make hand-tuned kernels difficult to scale.

SUMMARY

In one or more example implementations, an integrated circuit includes a plurality of kernels and a virtual machine coupled to the plurality of kernels. The virtual machine is configured to interpret instructions directed to different ones of the plurality of kernels. The virtual machine is configured to control operation of the different ones of the plurality of kernels responsive to the instructions.

In one or more example implementations, a method includes receiving, by a virtual machine running on electronic hardware, a first instruction. The method includes parsing, using the virtual machine, the first instruction to determine a first kernel from a plurality of kernels coupled to the virtual machine. The method includes configuring, by the virtual machine, the first kernel with configuration data to perform an operation specified by the first instruction. The configuration data specifies a buffer containing input data for the first kernel and a buffer to store data generated by the first kernel. The method includes causing, using the virtual machine, the first kernel to perform the operation as configured.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to artificial neural networks and, more particularly, to a reconfigurable neural engine with an extensible instruction set architecture for implementing artificial neural networks in integrated circuits. In accordance with the inventive arrangements described within this disclosure, a reconfigurable neural engine provides an architecture standard for integrating and/or using kernels. The reconfigurable neural engine may be used by a higher-level compiler and/or machine learning framework to design, control, and run kernels capable of performing machine learning operations of a machine learning model on a selected hardware platform.

In one or more examples, the reconfigurable neural engine is capable of interacting with a plurality of kernels. The kernels may be functionally independent and implement different machine learning functions. A machine learning function is a function performed by a type of layer of a machine learning model implemented as a multi-layered, artificial neural network. Examples of different types of machine learning functions that may be implemented as kernels include convolutional, general matrix-multiply (GEMM), BiasAdd (adding a bias to a value), aggregation, pooling, normalization, requantization, and activation functions such as Rectified Linear Unit (ReLu), Softmax, hyperbolic tangent (tan h), identity function, and/or the like.

Using the reconfigurable neural engine, a plurality of kernels may be assembled to run in a given hardware resource of a hardware platform. In one aspect, the reconfigurable neural engine operates as glue logic providing a standardized framework to control kernel(s) coupled to a virtual machine implemented as part of the reconfigurable neural engine. The virtual machine provides a standardized interface for any kernels coupled thereto. The standardized interface provides flexibility in that kernels may be added and removed (e.g., swapped) without disrupting the overall software stack of the reconfigurable neural engine.

The reconfigurable neural engine is capable of running the kernels independently of one another. The reconfigurable neural engine facilitates efficient usage of the underlying hardware resources of the hardware platform while also providing software-level programmability of the kernels. The reconfigurable neural engine is capable of providing improved compute capabilities and improved memory utilization compared to other kernel implementation technologies. The reconfigurable neural engine implements a control mechanism that allows any high-level framework to program and control the kernels individually. Further aspects of the inventive arrangements are described below with reference to the figures.

Figure 1:
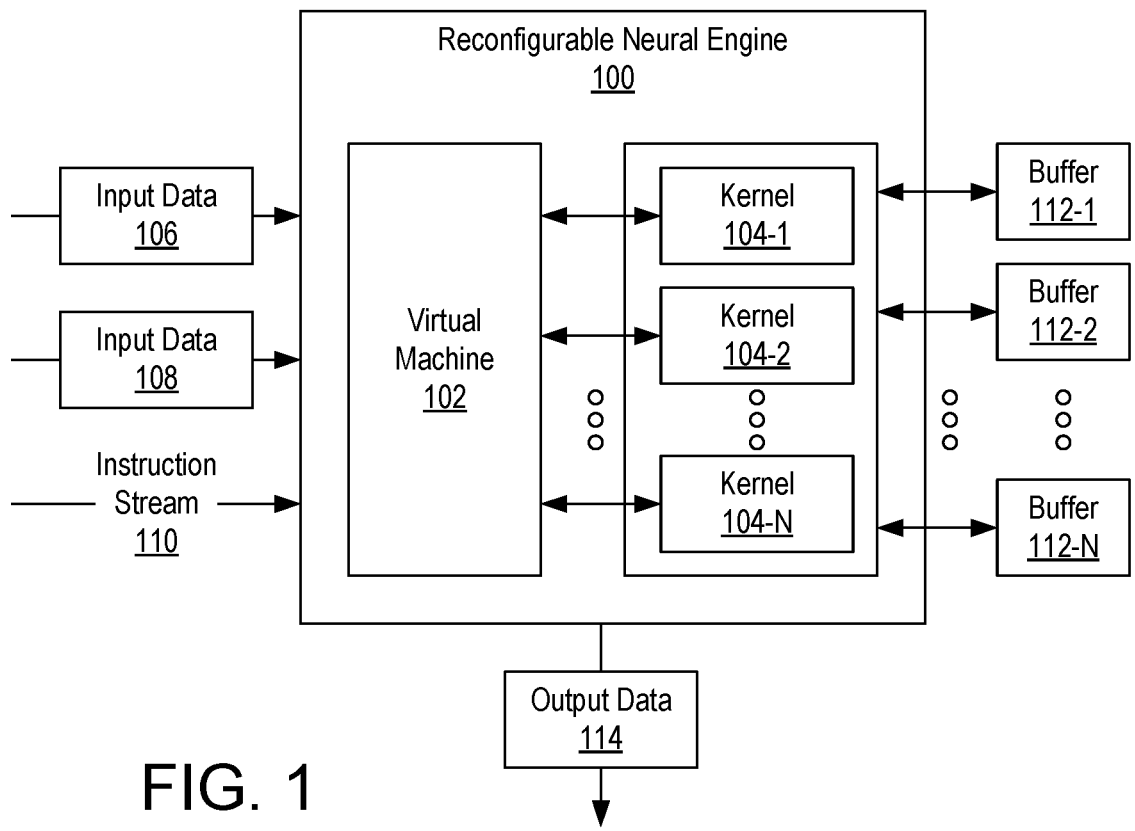
FIG. 1 illustrates an example of a reconfigurable neural engine.

FIG. 1 illustrates an example of a reconfigurable neural engine 100.

Reconfigurable neural engine 100 refers to a particular implementation or instance of a virtual machine 102 coupled to one or more kernels 104 (e.g., 104-1, 104-2 through 104-N). Virtual machine 102 is capable of receiving input data 106, input data 108, and one or more instructions via instruction stream 110. In an example implementation, each of input data 106, 108 may represent a window of data of a particular size. For purposes of illustration and not limitation, input data 106 and input data 108 each may be a 2×8 kB window of data (e.g., the windows are double buffered in this example).

Reconfigurable neural engine 100 is capable of performing memory management for kernels 104 by regulating access of different ones of kernels 104 to different ones of buffers 112 (e.g., 112-1, 112-2, through 112-N). Buffers 112 may be local memory buffers for kernels 104. Kernel 104 may operate on input data 106 and/or 108 as stored in buffers 112 and generate results that are output as output data 114. Output data 114 may be an output window or data stream.

In the example of FIG. 1, kernels 104 may implement any of a variety of different machine learning functions. For example, kernel 104-1 may be a GEMM kernel. Kernel 104-2 may be a BiasADD kernel. Another kernel 104 may be a ReLU kernel. Yet another kernel 104 may be a requantize kernel (e.g., a kernel capable of performing shift and scale functions). Still other kernels 104 may implement other machine learning functions such as Gaussian Error Linear Units (GELU), layer normalization, Softmax, or the like. The example machine learning functions provided herein are intended to be a non-exhaustive list of machine learning functions that may be implemented by kernels 104.

Virtual machine 102 is capable of receiving instructions (e.g., as instruction stream 110) from another circuit and/or system. Virtual machine 102 is capable of interpreting the received instructions. In response to the instructions and interpretation thereof, virtual machine 102 is capable of controlling operation of kernels 104. The interpretation of instructions by virtual machine 102 makes kernels 104 programmable. More particularly, responsive to the received instructions, virtual machine 102 is capable of selecting one or more of kernels 104, configuring particular aspects of the selected kernel(s) 104, managing local memory buffers of the selected kernel(s) 104, running the selected kernel(s) 104, and, potentially returning data generated by selected kernel(s) 104 (e.g., as output data 114).

In one or more examples, virtual machine 102 is implemented as a state-machine that is configured to receive and operate on instruction stream 110 as generated and/or provided by another circuit and/or system. Virtual machine 102 is capable of parsing incoming instructions to determine the size of the instruction packet, determine which kernel will be run based on an opcode parsed from the instruction, determine memory availability and reuse, and assign buffers 112 to the kernel to be run as specified by the opcode. In this regard, reconfigurable neural engine 100 is compatible with any higher-level framework (e.g., circuit and/or system) that can support the instruction format used by reconfigurable neural engine 100 and, more particularly, virtual machine 102.

Use of reconfigurable neural engine 100 provides a greater level of abstraction compared to conventional techniques of running kernels. This abstraction allows kernels 104 used with reconfigurable neural engine 100 to be scaled more easily and solves the placement and routing issues relating to using fixed-function kernels. Kernel reuse is also supported in that reconfigurable neural engine 100 provides a standardized interface for kernels 104 that encourages a plug-and-play development paradigm. That is, kernel 104-1 may be replaced with another kernel 104 that performs a different function without significant reimplementation of the software stack so long as the new or different kernel is capable of interfacing with, e.g., follows the standard interface provided by, virtual machine 102 for kernels.

Reconfigurable neural engine 100 also provides a high degree of portability between different kernels. For example, another circuit and/or system may be updated to generate compatible instructions for virtual machine 102. Virtual machine 102 is capable of interpreting the instructions as received to control, tune (e.g., configure), and run any kernels coupled thereto. The lower-level implementation details of the kernels, however, can remain unchanged.

The example of FIG. 1 may be implemented using any of a variety of different hardware platforms. In one aspect, the hardware platform is implemented as a data processing array. An example of a data processing array is implemented as a plurality of hardwired circuit blocks. The plurality of circuit blocks may be programmable. The data processing array may include a plurality of compute tiles and an interface block. In general, a compute tile includes a core that has data processing capabilities and a local (L1 cache)

memory that may be used to implement buffers 112. The local memory can potentially also be accessed by other cores in the data processing array, subject to constraints. The data processing array can include a shared memory (L2 cache also referred to as memory tiles) that is accessible by all cores in the data processing array. An example data processing array is described in connection with FIG. 7. A data processing array as illustrated in FIG. 7 may be programmed to implement one or more operations of a deep neural network.

In one aspect, reconfigurable neural engine 100 may be implemented in a compute tile of the data processing array. For example, reconfigurable neural engine 100 may be deployed to a core of a compute tile of the data processing array. In another aspect, a plurality of instances of reconfigurable neural engine 100 may be deployed to multiple cores (e.g., of multiple compute tiles) of the data processing array. In the case where reconfigurable neural engine 100 is running on multiple compute tiles, another circuit and/or system (e.g., one capable of running a high-level framework such as a controller and/or processor) may be used to schedule instructions and data for the multi-compute tile implementation.

In another aspect, the hardware platform may be implemented as programmable circuitry. Reconfigurable neural engine 100 may be implemented in programmable circuitry. Programmable circuitry may include or be implemented as programmable logic. An example of programmable circuitry is described in connection with FIG. 7. In still other examples, reconfigurable neural engine 100 may be implemented as a combination of a processor (e.g., a hard or soft processor) and programmable circuitry that implements the kernels.

Figure 7:
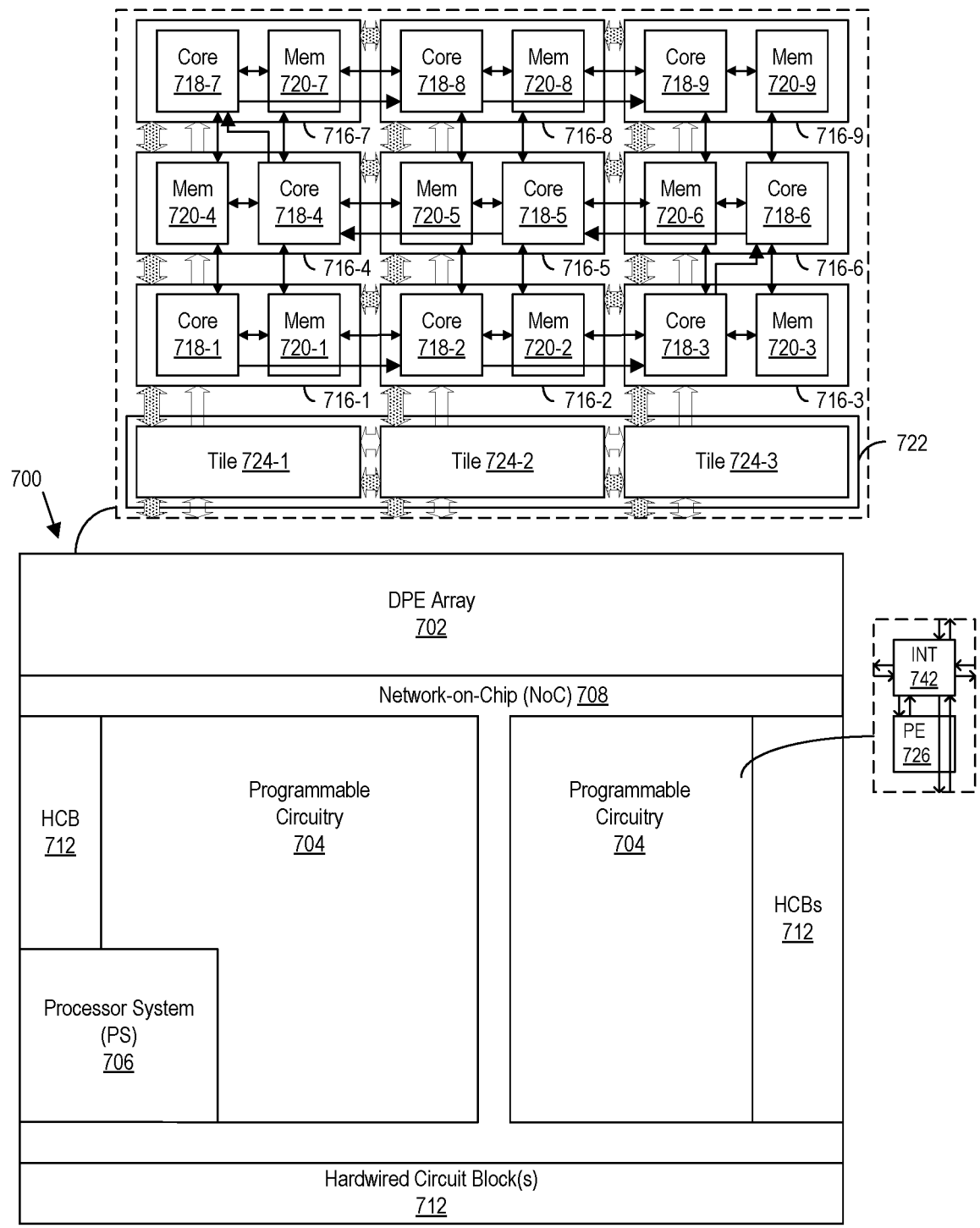
FIG. 7 illustrates an example of an integrated circuit capable of implementing one or more instances of a reconfigurable neural engine.

In the example of FIG. 7, a single IC is capable of providing multiple different types of hardware platforms that are capable of implementing reconfigurable neural engine 100. It should be appreciated that the inventive arrangements may be used with other types of ICs that include only a data processing array, a data processing array in combination with one or more other systems, only programmable circuitry, and/or programmable circuitry in combination with one or more other systems. Further, a machine learning design may be realized with one or more instances of reconfigurable neural engine 100 implemented in one type of hardware platform while one or more other instances of reconfigurable neural engine 100 are implemented in a different type of hardware platform. In still other examples, reconfigurable neural engine 100 may be implemented using a single processor or using one or more processors. Further, the different implementations may operate in a coordinated manner as part of a same or common machine learning design implemented in the IC.

In one or more examples, two (or more) different implementations of reconfigurable neural engine 100 may be implemented. For purposes of illustration, in an example, a compute tile may execute two (or more) different implementations of reconfigurable neural engine 100. A first implementation of reconfigurable neural engine 100 may include kernels A, B, and C configured to operate on mixed-precision data. A second implementation of reconfigurable neural engine 100 may include kernels that are configured to operate on integer data (e.g., int8). For example, the kernels in the second implementation of reconfigurable neural engine 100 may perform matrix multiplication, BiasADD, ReLU, etc. The second implementation of reconfigurable neural engine 100 can provide improved latency and throughput compared to the first implementation of reconfigurable neural engine 100 that is capable of operating on mixed-precision data.

The foregoing example of using multiple different reconfigurable neural engine 100 implementations illustrates one way in which reconfigurable neural engine 100 is capable of supporting evolving compute algorithms and dataflow throughputs.

As noted, each kernel in reconfigurable neural engine 100 may be run independently under control of virtual machine 102 in response to instructions provided to virtual machine 102. The instructions may be generated by an entity such as another circuit and/or system (e.g., controller and/or processor) implementing a high-level framework such as, for example, Tensor Virtual Machine (TVM), PyTorch, TensorFlow, or the like. These instructions may be passed down from that entity to the various reconfigurable neural engine 100 implementation(s) and/or instance(s) during runtime.

The instructions received and interpreted by virtual machine 102 may include configuration data that can be used by virtual machine 102 to configure the respective kernels 104. That is, virtual machine 102 may receive an instruction. From the instruction, virtual machine 102 is capable of determining the particular kernel(s) 104 to which instruction pertains, configure the kernel in accordance with predetermined rules within virtual machine 102 and/or configuration data specified by the instruction, and invoke or run the kernels. The configuration data, whether hard coded within virtual machine 102 or obtained from the received instruction may be provided to the kernel specified by the instruction to cause the kernel to operate in a particular mode of operation that may be one of a plurality of different modes of operation for the selected kernel(s) 104.

As an example, consider the case where kernel 104-1 implements a linear approximation kernel. That is, kernel 104-1 may implement any one of a plurality of different functions (e.g., activation functions) through linear approximation. In that case, virtual machine 102 determines configuration data specified by a received instruction specifying the linear approximation kernel, provides the configuration data to the kernel, and invokes the kernel. In this example, the configuration data may specify different coefficients to be used by the kernel in performing an operation. The particular coefficients may be specific to the mode of operation and the linear approximation performed. Thus, the particular mode of operation of the kernel may be invoked by way of passing different instructions targeted to the same kernel, albeit with different configuration data to virtual machine 102.

In one aspect, reconfigurable neural engine 100 may be instantiated in a machine learning application specified as a graph. More particularly, reconfigurable neural engine 100 may be instantiated in the application graph class in a separate header file similar to how a kernel is instantiated. The header file can use available Application Programming Interfaces (APIs) of a development tool to connect reconfigurable neural engine 100 (e.g., virtual machine 102) to other kernel(s) and provide data flow information. The standardized interface for kernels provided by virtual machine 102 allows kernels to be reused in different machine learning models. Further, the kernels may be reconfigured through the high-level instructions received by the virtual machine 102.

The example source code of Listing 1 illustrates an example of instantiating reconfigurable neural engine 100 through a graph Application Programming Interface (API). In the example of Listing 1, GMIO ports are used to pass data between a device memory (e.g., Double Data Rate, Synchronous Dynamic Random Access Memory (DDR)) and reconfigurable neural engine 100. The device memory refers to a memory that is a global memory accessible by instances of reconfigurable neural engine 100 as implemented in the hardware platform. GMIO is a class that represents the I/O port attribute specification used to make external memory-mapped connections to or from the global memory (e.g., device memory). In the example source code of Listing 1, "arne" represents reconfigurable neural engine 100.

Listing 1

```
class my_arne_impl : public adf:: graph {
  private:
    adf::kernel arne_impl;
  public
    input_gmio gmIn0;
    output_gmio gmOut0;
    my_arne_impl( ) {
      //GMIO interface
      gmIn0 = input_gmio::create(64,1);
      gmOut0= output_gmio::create(64,1)
      arne_impl = adf::kernel::create(arne_implementation);
      adf::source(arne_impl)="../kernels/arne_implementation.cc"
      adf::runtime(arne_impl)=0.9;
      adf::connect< adf::stream,
      adf::window<WINDOW_SZ*sizeof(int32)>
>(gmIn0.out[0], arne_impl.in[0]);
      adf::connect< adf::window<WINDOW_SZ*sizeof(int8)>,
      adf::stream>((
arne_impl.out[0] ), gmOut0.in[0]);
    }//end constructor
}; // end class
```

As illustrated in Listing 1, reconfigurable neural engine 100 is capable of supporting any kernel data access types including window-based data access through input_window and output_window as show in Listing 1. Further, reconfigurable neural engine 100 is capable of supporting stream-based accesses such as input_stream and output_stream in Listing 1. The types of data access supported by reconfigurable neural engine 100 (e.g., virtual machine 102) may include any data type accesses supported by a kernel.

The example source code of Listing 2 illustrates an implementation of reconfigurable neural engine 100 that includes one stream instruction, two input windows for providing input data 106 and 108 and one output window providing output data 114.

Listing 2

```
void        arne_implementation(input_window_int8*bufA,
input_window_int8*bufB,        input_stream_int8*bufI,
output_window_int8*bufOut);
```

In another aspect, reconfigurable neural engine 100 is capable of using multiple stream connections that are shared on a single physical channel. The multiple stream connections may be split out using a packet switching construct. The example source code of Listing 3 illustrates use of the "pktsplit" construct to split multiple input stream connections that share a single physical channel into an instruction window and a data window. The pktsplit construct in the example of Listing 3 splits one buffer into an instruction buffer and a data buffer that goes to different inputs of virtual machine 102.

Listing 3

```
pktsplit<Qm+1>sp_;
connect<stream, pktstream>(in_[0].out[0], sp_.in[0]);
connect<pktstream,   window<instr_window_sz>>(sp_.out
[0], kernels_.in[2]);
connect<pktstream,     window<window0_sz>>(sp_.out[1],
kernels_.in[0]);
```

Virtual machine 102 may be implemented to support a particular instruction format. In an example implementation, virtual machine 102 is implemented to use a static instruction format.

Figure 2:
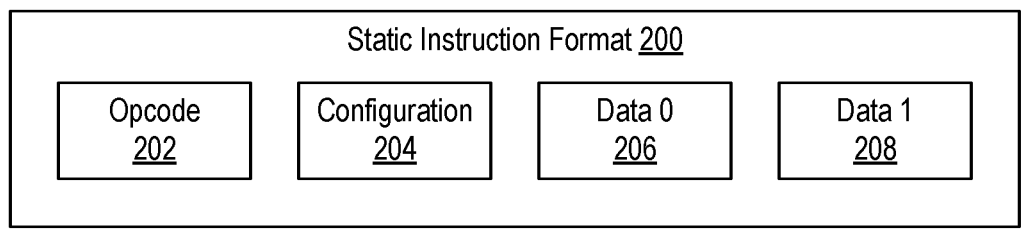
FIG. 2 illustrates an example of a static instruction format that may be used by a virtual machine of a reconfigurable neural engine.

FIG. 2 illustrates an example of a static instruction format 200 that may be used by virtual machine 102. The instruction format is referred to as fixed in that the instructions have a fixed length. In the example of FIG. 2, instruction format 200 is implemented as a vector that includes 4 fields including an opcode field 202, a configuration field 204, a data field 206 (e.g., data 0), and a data field 208 (e.g., data 1). In one aspect, each field may be specified as an integer data type of a particular size such as 8, 16, or 32 bits. It should be appreciated that the example sizes are provided for purposes of illustration and are not intended as limitations.

Opcode field 202 specifies the particular kernel that is to be run. For example, virtual machine 102 may include a pre-configured opcode-to-kernel map. For a given instruction, in parsing the opcode from the instruction, virtual machine 102 determines the particular kernel 104 that is to be run in response to the instruction. For example, an opcode of "0" may be mapped to a general matrix multiply kernel. An opcode of "1" may be mapped to a ReLU kernel. An opcode of "2" may be mapped to a BiasAdd kernel, and so forth.

The configuration field 204 may be a customizable field. That is, a kernel designer may define particular operating modes in which that designer's kernel may operate. The configuration field 204 may include configuration data that specifies the particular operating mode to be implemented by the kernel specified by the opcode field 202.

As an example, the least significant bit (LSB) of the configuration field 204 may be used to indicate whether, for an iteration (e.g., run) of the kernel initiated by the instruction, the kernel will output a value. As another example, the second LSB of the configuration field 204 may be used to indicate whether the output of the kernel is to be shifted. Further data bits of the configuration field 204 may specify the number of bits to shift data if a shift is to be applied.

The configuration field 204 may be customized on a per-kernel basis. That is, the configuration data included in configuration field 204 may be kernel-specific. Thus, the meaning of bits in configuration field 204 of an instruction for kernel 104-1 may differ from the meaning of bits in configuration field 204 of an instruction for kernel 104-2. Appreciably, virtual machine 102 is capable of correctly interpreting the configuration bits/data specified in the configuration field 204 based on the particular opcode specified in the received instruction.

The data fields 206, 208 specify addresses for data, e.g., buffers, that may be used by the kernel. In one aspect, one or more bits of data of the configuration field 204 field may specify what each of data fields 206, 208 is to be used for. That is, based on the data bits of configuration field 204, data field 206 may specify an input buffer (e.g., input data 106), data field 208 may specify a different input buffer (e.g., input data 108), data field 208 may specify an accumulation buffer, scratch space, and/or an output buffer (e.g., output data 114). Thus, the kernel designer may specify, by way of data bits of configuration field 204, the purpose of data specified by one or both of data fields 206, 208. In this example, static instruction format 200 may be used to implement memory management functions by using data fields 206 and/or 208 to specify various types of buffers to be used by the kernel.

The example source code of Listing 4 may be incorporated into virtual machine 102 and illustrates an example in which virtual machine 102 determines whether the output of the GEMM kernel is to be shifted based on the data bits of configuration field 204. The example of Listing 4 determines whether the output of the GEMM kernel is to be shifted to the right and by how many bits.

Listing 4

```
If (op_code == GEMM) {
    int8 is_init = op_conf & 1;
    int8 is_wait = (op_conf >> 1) & 1;
    int8 is_shift = (op_conf >> 2) & 1;
    int8 shift_val = is_shift ? (int)op_data0 : 0;
```

The static instruction format 200 of FIG. 2 provides certain benefits such as a virtual machine 102 implementation of reduced complexity.

In one or more other examples, reconfigurable neural engine 100 may be implemented with virtual machine 102 configured to parse a dynamic instruction format. A dynamic instruction format may be specified as a base class for the instruction that contains fields that are shared by all the kernels in reconfigurable neural engine 100. The derived class may specify kernel-specific configuration and data fields.

The example source code of Listing 5 illustrates an example of a dynamic instruction header file for a machine learning model that includes GEMM, Requantize, Loopback, and General Non-Linear kernels. The example source code of Listing 5 illustrates the base class "op_base." The base class "op_base" contains shared fields such as size_in_bytes which specifies a size of the instruction in bytes, is_init which is used for kernel initialization, and is wait which is used for kernel control. The base class is instantiated in the kernel-specific instruction, derived class, along with custom configuration fields and data fields. For example, the custom data fields is_shift and shift_val are specified for a GEMM instruction directed to the GEMM kernel. By providing size_in_bytes through the base class, virtual machine 102 is capable of determining how many bytes are used for the instruction of each kernel during runtime. Shared configuration fields may be decoded by virtual machine 102 before passing the custom configuration fields and custom data fields of the instruction to the specified kernel.

Listing 5

```
enum op_types{
    e_loopback,
    e_gemm,
    e_requantize,
    e_non_linear
};
typedef struct{
    enum op_types type;
    unsigned in size_in_bytes;
    //Shared Config Fields
```

-continued

Listing 5

```
    int8 is_init;
    int8 is_wait;
    int8 mem_idx;
} op_base;
typedef struct{
    op_base b;
    int32 val;
} op_loopback;
typedef struct{
    op_base b;
    int8 is_shift;
    int shift_val;
} op_gemm;
typedef struct{
    op_base b;
    int multiplier;
    int q_shift;
} op_requantize;
typedef struct{
    op_base b;
    int8 custom_configuration;
    int8 a;
    int8 b;
    int8 c;
    int8 d;
} op_non_linear;
```

In another aspect, the dynamic instruction format may be used to manage local memory for kernels. The dynamic instruction format may specify one or more bits that define an input buffer to be used for a given instruction and/or an output buffer to be used for a given instruction.

Figure 3:
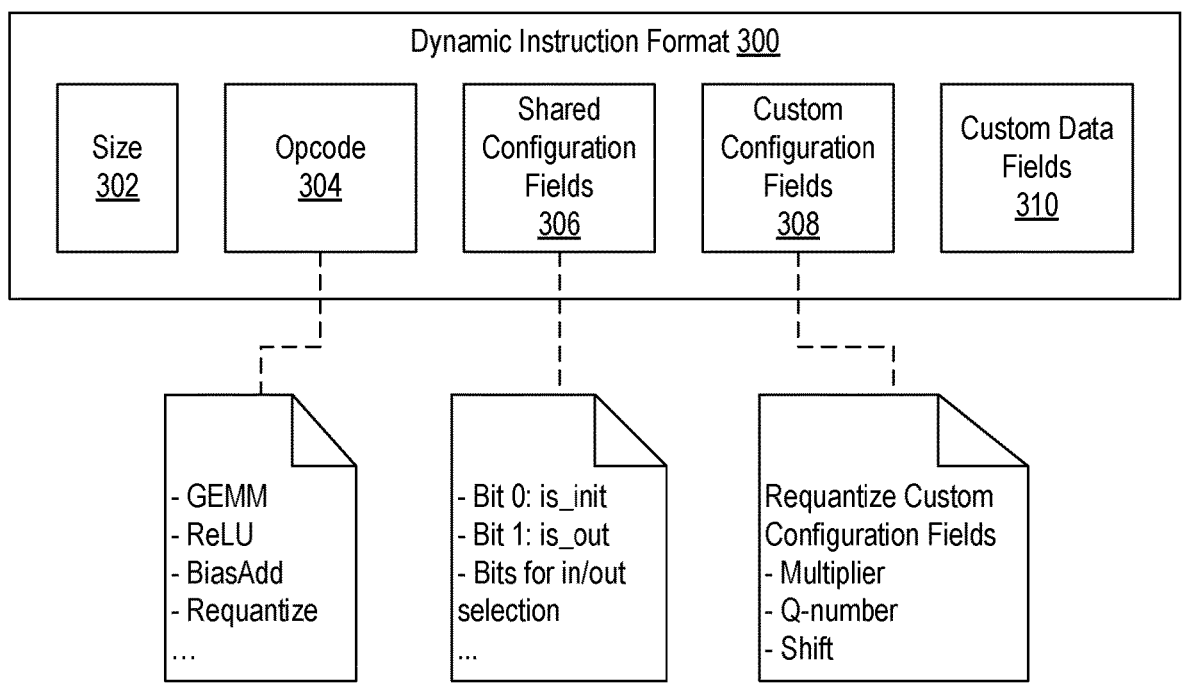
FIG. 3 illustrates an example of a dynamic instruction format that may be used by a virtual machine of a reconfigurable neural engine.

FIG. 3 illustrates an example of a dynamic instruction format 300. In the example of FIG. 3, the dynamic instruction format 300 includes a size field 302, an opcode field 304, one or more shared configuration fields 306, one or more custom configuration fields 308, and one or more custom data fields 310. The size field 302 may be the size_in_bytes field. Opcode 304 may specify the particular kernel to be executed as described in connection with FIG. 2. For purposes of illustration and not limitation, in the example of FIG. 3, opcode field 304 may specify a kernel such as GEMM, ReLu, BiasAdd, Requantize, or the like. Shared configuration field(s) 306 may specify bits indicating the status of is_init, is_out, and/or bits specifying particular input and/or output buffer(s). Custom configuration fields 308 may specify additional configuration fields on a per opcode basis. For example, for an opcode specifying the Requantize kernel, custom configuration field(s) 308 may specify configuration data such as a multiplier, a Q-number, and/or an amount by which to shift data.

In the example of FIG. 3, a kernel may run multiple times before outputting data. If a kernel runs 4 times, for example, four instructions for the kernel will be received by virtual machine 102. The shared configuration fields 306 may contain different data for the different iterations or runs of the kernel. The is_init bit may be used in an instruction to indicate whether a specified buffer should be zeroed (e.g., initialized). The is_waiit bit may be used in an instruction to indicate whether the kernel is outputting data (e.g., in the last iteration) or storing data in a different buffer for reuse in a next iteration or run (e.g., the first three of the four iterations). Other bits may be used to indicate whether the kernel is to shift data and by how much for a given run.

Figure 4:
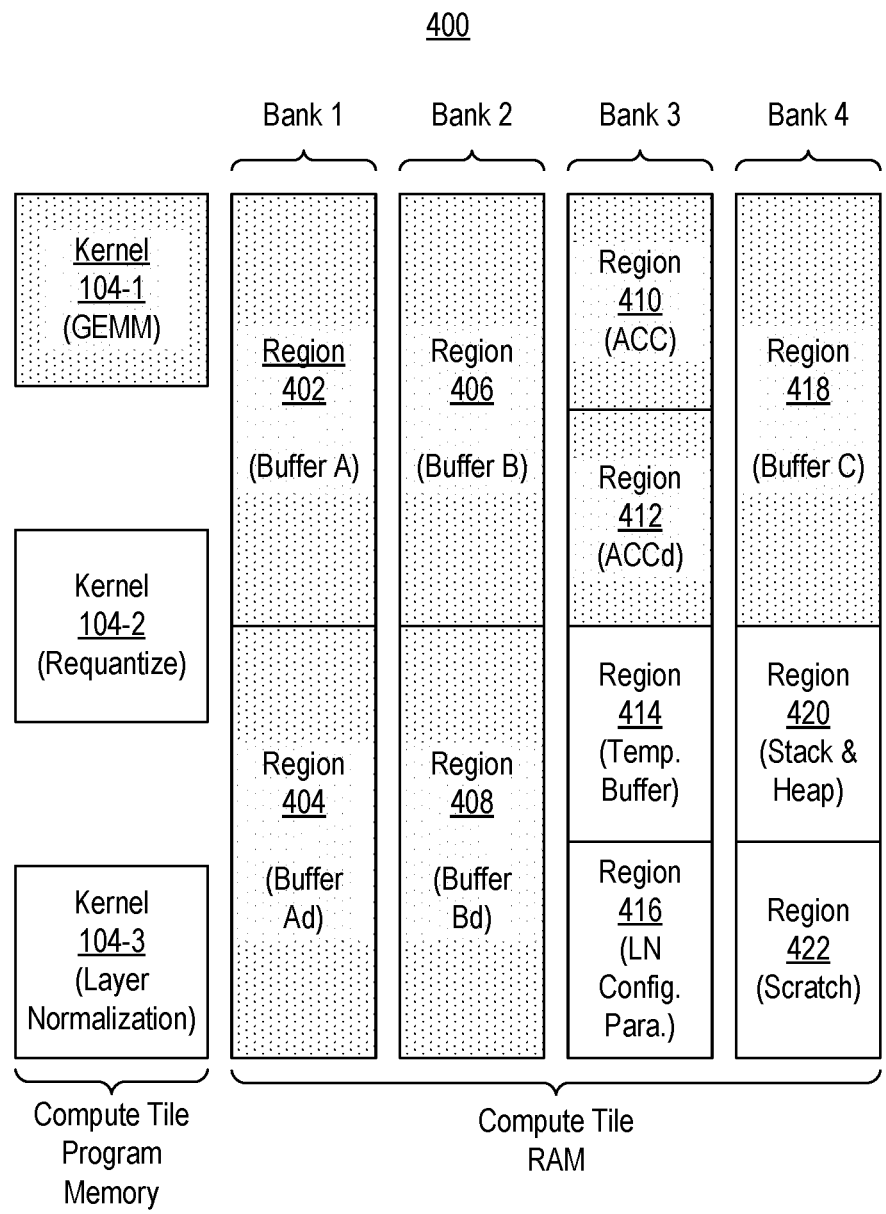
FIG. 4 illustrates an example memory layout for use with an instance of a reconfigurable neural engine.

FIG. 4 illustrates an example memory layout 400 for use with an instance of reconfigurable neural engine 100. Memory layout 400 may be implemented within a compute tile of a data processing array. For example, kernels 104 may be loaded into a program memory of a compute tile. More particularly, kernels 104 may be loaded into the program memory of a core of a compute tile. The remaining portions of memory layout 400 may be implemented in the RAM of the compute tile (e.g., level 1 cache) as spread out over banks 1, 2, 3, and 4. An example of a compute tile is described in connection with FIGS. 7 and 8.

For purposes of illustration, in the instance of reconfigurable neural engine 100, kernel 104-1 is a GEMM kernel, kernel 104-2 is a requantize kernel, and kernel 104-3 is a layer normalization kernel. Kernels 104 are loaded in, and executed from, compute tile program memory. The instance of reconfigurable neural engine 100 is provided for purposes of illustration and not limitation. Other implementations of reconfigurable neural engine 100 may include fewer or more kernels and/or different kernels than those illustrated.

In the example, the shaded portions of memory layout 400 correspond to active or used regions of memory. In the example, kernel 104-1 is executing and is using the shaded regions of memory in compute tile RAM. Region 402 stores buffer A (e.g., an input matrix for kernel 104-1) while region 406 stores buffer B (e.g., an input matrix B for kernel 104-1). Regions 404 and 408 store data for a next run of kernel 104-1 illustrated as buffers Ad and Bd, respectively. In the example, each of banks 1 and 2 is split into two regions so that data may be loaded into buffers A and B and then buffers Ad and Bd in ping-pong fashion. Thus, while kernel 104-1 operates on buffers A and B, buffers Ad and Bd may be loaded into regions 404 and 408, respectively. For example, buffer A (and buffer Ad) may correspond to input data 106, while buffer B (and buffer Bd) may correspond to input data 108.

Region 410 stores an accumulation (ACC) buffer for kernel 104-1. Region 412 stores another accumulation buffer (ACCd) for kernel 104-1 that may be used in ping-pong fashion with the ACC buffer of region 410. Region 418 stores a buffer C for kernel 104-1, e.g., an output buffer corresponding to output data 114. Region 414 stores a temporary buffer that may be used for kernel 104-1 during runtime. The temporary buffer may be overwritten by another kernel such as kernel 104-3 when that kernel runs. Region 416 may be used to store a buffer that includes configuration parameters for the layer normalization kernel (e.g., kernel 104-3). Region 420 may store stack and heap data. Region 422 may be used to store intermediate results as "scratch" data.

In using reconfigurable neural engine 100, kernels may be used in a "plug-and-play" fashion. That is, one kernel may be removed and replaced (e.g., "swapped out") with another different kernel. The two kernels may or may not have the same memory footprints. Accordingly, in one aspect, to increase portability and reduce engineering time, memory management for reconfigurable neural engine 100 may be determined at the time of creation.

The example of FIG. 4 illustrates how a static memory layout may be used in cases where all of the data needed by each kernel fits into the available memory (e.g., into compute tile RAM). While it may be possible to organize all the kernels to use the available memory for operations, this static memory layout may reduce reusability of reconfigurable neural engine 100 for different sized input data for the different kernels, reduce portability of the kernels, and reduce kernel plug-and-play capabilities. As illustrated in the example of FIG. 4, the tightly packed data, which utilizes all of the available compute tile RAM for the three kernels 104 must undergo significant redesign if one of the kernels should need more memory to store configuration parameters or if an additional kernel is to be added. If sufficient space is available in memory, however, one or more additional kernels may be added to a given reconfigurable neural engine 100 implementation without disturbing the memory layout.

Figure 5:
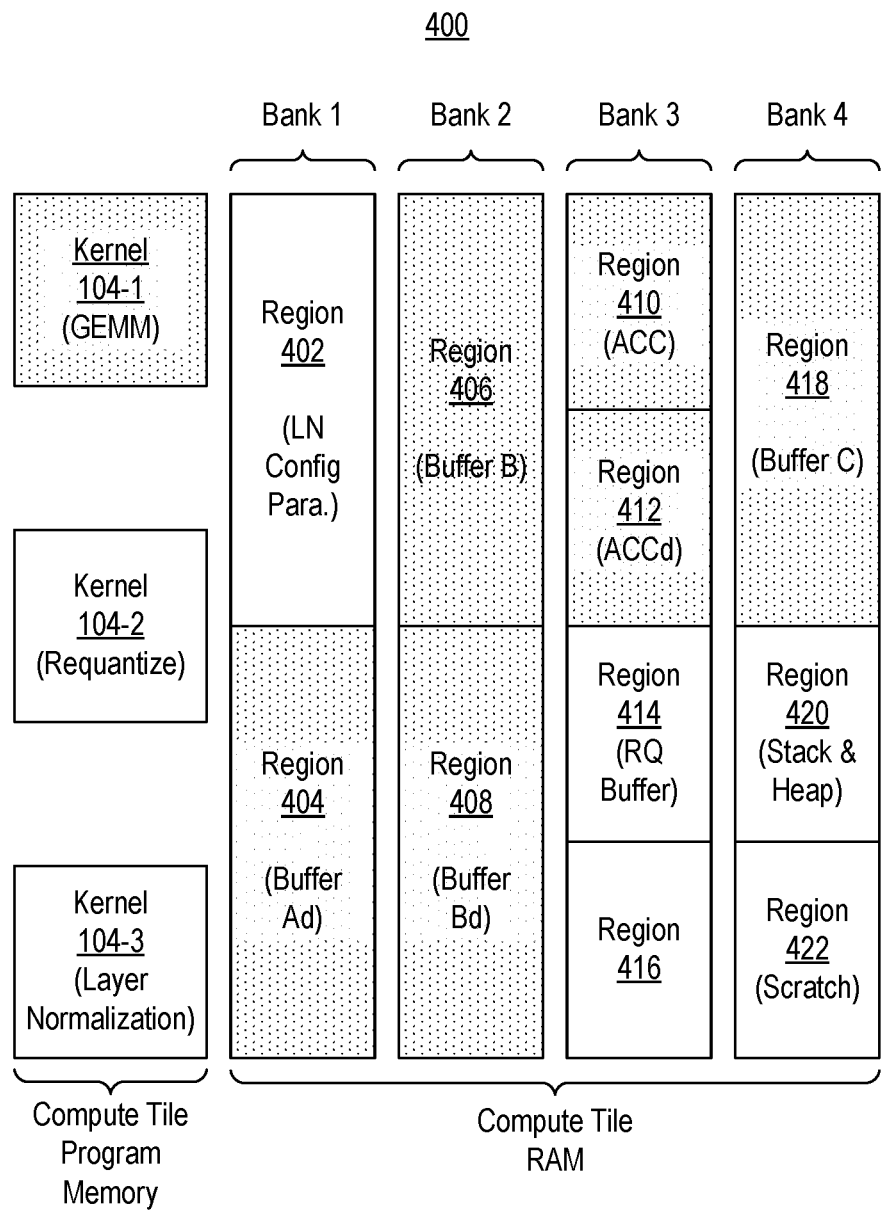
FIG. 5 illustrates another example of a memory layout for an instance of a reconfigurable neural engine in which memory management is performed during runtime.

FIG. 5 illustrates another example of a memory layout 500 in which memory management is performed during runtime. Memory management, in the example of FIG. 5, may be performed by virtual machine 102 responsive to instructions received by virtual machine 102.

In one example, shared configuration fields 306 may be used to associate regions of the memory with a memory map maintained by virtual machine 102. The memory map tracks the state of the different regions of memory and indicates whether a given region of the memory may be reused or repurposed by a different kernel, for example. For instance, a (1) for a given region of memory in the memory map indicates that the region may be reused. A (0) for a given region of memory in the memory map indicates that the region may not be reused. The memory map may also specify a pointer to a starting location of a buffer stored in a given region and a size of the buffer stored in the region.

Referring to FIG. 5, the shaded regions of memory are currently in use by kernel 104-1, which is also shaded. In the example, kernel 104-1 is running. For purposes of illustration, region 416 does not store layer normalization parameters, but rather other data. Region 414 stores a requantize buffer for use by kernel 104-2. In the example of FIG. 5, region 402 initially stored buffer A for use by kernel 104-1. Because the memory map maintained by virtual machine 102 indicated that buffer A may be reused (e.g., the memory map includes an entry such as "mem_ready [GEMM_BUFF_A]==1" indicating that buffer A for kernel 104-1 is available for reuse), virtual machine 102 has overwritten buffer A in region 402 with layer normalization parameters that may be used by kernel 104-3 upon execution of kernel 104-3.

In the example of FIG. 5, virtual machine 102, in response to determining that kernel 104-1 no longer needs buffer A due to the memory map indicating a status of "1" for buffer A, loads different data in region 402 effectively repurposing region 402 for use by another kernel. In the example, a higher-level framework that provides the instructions to virtual machine 102 is capable of determining when the GEMM operation performed by kernel 104-1 has completed or that the data from region 402 has been read by kernel 104-1 and is no longer needed in memory. The ability to repurpose regions of memory improves memory reusability to support kernels that may need to store various types of data such as lookup tables or store large amounts of intermediate results to perform processing. The repurposing allows the use of a particular region of memory to be reallocated from a first kernel to a second kernel prior to the first kernel completing execution thereby increasing runtime efficiency.

In addition to facilitating memory reusability, the memory management function of virtual machine 102 also allows kernels to share data with one another within the same compute tile. For example, kernels executed by a same core (e.g., in a same compute tile) may share input and/or output data with one another. The sharing of data among kernels can be implemented by providing an instruction for the kernel that causes the kernel to read a particular memory buffer for input and/or to store output to a particular (e.g., a different) memory buffer.

The example code of Listing 6 illustrates a portion of two example instructions with the dynamic instruction format.

| Listing 6 | |
|---|---|
| 1 | OP: [00] -> GEMM<br>IN: [1100] -> [A, B, ACC, C]<br>OUT: [0010] -> [A, B, ACC, C] |
| 2 | OP: [01] -> REQUANTIZE<br>IN: [0010] -> [A, B, ACC, C]<br>OUT: [0001] -> [A, B, ACC, C] |

The first instruction includes an opcode (OP) selecting the GEMM kernel. The first instruction includes an input portion (IN) specifying the buffers from which the GEMM kernel is to read input data. In this example, the IN portion specifies values of "1" for input buffers A and B. The output portion (OUT) of the first instruction includes a "1" corresponding to the accumulation buffer, which causes the GEMM kernel to write output to the accumulation buffer. In response to instruction 1, virtual machine 102 configures the GEMM kernel to perform an operation using the designated buffers and runs the kernel as configured.

The second instruction includes an opcode (OP) that, in this example, selects the requantize kernel. The second instruction includes an input portion (IN) specifying the buffers from which the requantize kernel is to read input data. In this example, the IN portion specifies values of "1" for the accumulation buffer. The output portion (OUT) of the second instruction includes a "1" corresponding to buffer C, which causes the requantize kernel to write output to buffer C. In response to instruction 2, virtual machine 102 configures the requantize kernel to perform an operation using the designated buffers as configured.

The example of Listing 6 illustrates how virtual machine 102, in processing the received instructions, causes a first kernel (e.g., the GEMM kernel) to keep writing the data into a selected buffer (e.g., the accumulator buffer) instead of the output buffer C. In the example, the GEMM kernel is not outputting data, but rather storing the data in a different buffer that is available for use by another kernel. Next, or subsequently, a second kernel (e.g., the requantize kernel) operates on the selected buffer (e.g., the accumulator buffer) as input data and stores the resulting data in the output buffer C (e.g., output data 114) which may be conveyed to another circuit and/or system via a stream channel. This functionality provides greater control over the memory layout at runtime and provides more efficient use of the memory layout. Further, the need to re-engineer machine learning models by determining new and/or different memory layouts when trying out different kernel options is reduced.

Figure 6:
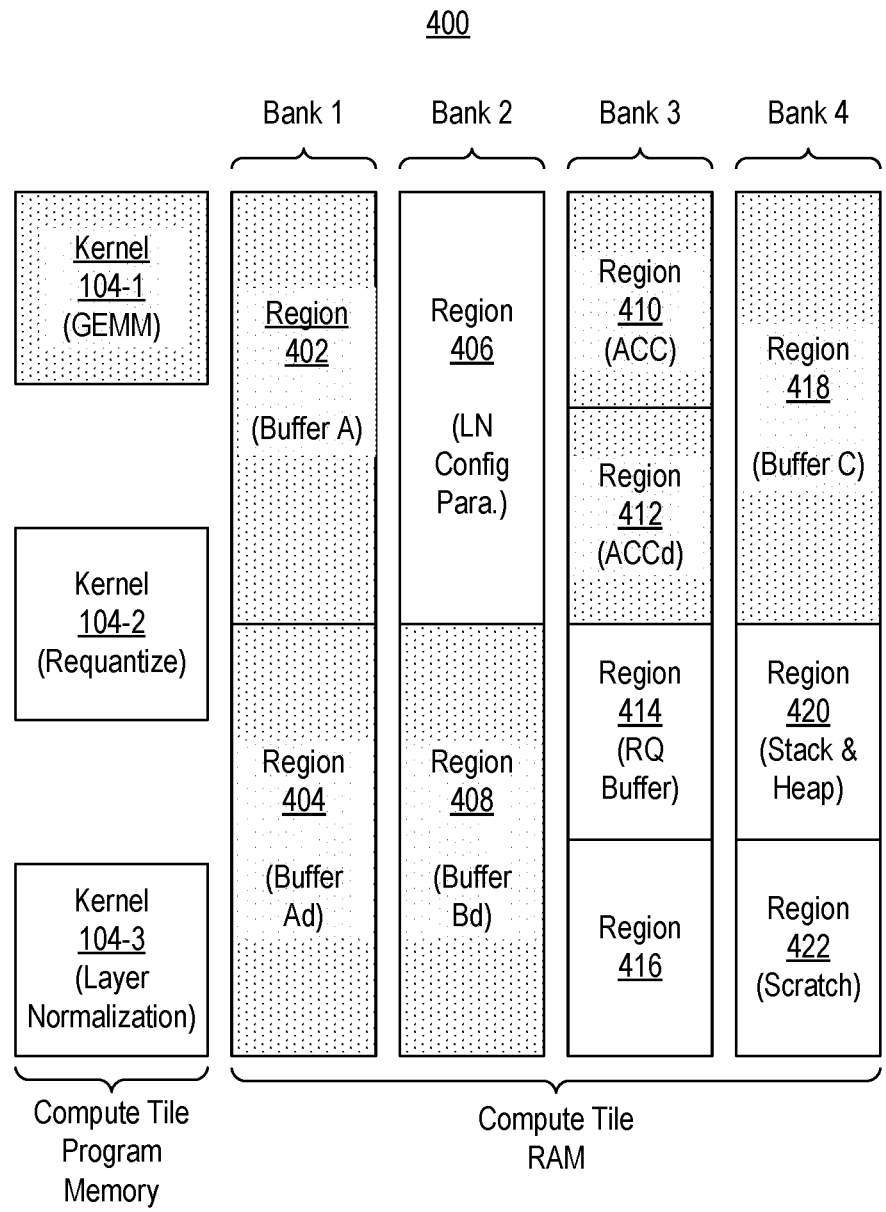
FIG. 6 illustrates another example of a memory layout for an instance of a reconfigurable neural engine in which memory management is performed during runtime.

FIG. 6 illustrates another example of memory layout 500 in which memory management is performed during runtime. In the example of FIG. 6, the memory map indicates that buffer B is available for reuse. That is, because the memory map maintained by virtual machine 102 indicated that buffer B may be reused (e.g., the memory map includes an entry such as "mem_ready[GEMM_BUFF_B]==1" indicating that buffer B for kernel 104-1 is available for reuse), virtual machine 102 has overwritten buffer B in region 402 with layer normalization parameters that may be used by kernel 104-3 upon execution of kernel 104-3.

In order to integrate a kernel into a particular reconfigurable neural engine 100 implementation, the kernel must conform to the interface requirements of virtual machine 102. Virtual machine 102 is solely responsible for interacting with input data and output data on behalf of any integrated kernel. That is, input data may only be provided to a kernel by way of input data 106, 108, each of which may be an input window of a particular size, and through the stream interface over which input data 106, 108 is conveyed. Kernels integrated into a reconfigurable neural engine 100 implementation must use pointers to access the contents of the local memory (e.g., compute tile RAM of FIGS. 4, 5, and/or 6).

The example source code of Listing 7 illustrates a scenario where kernels use pointers to access local memory. In the example of Listing 7, each kernel (e.g., ReLU, BiasAdd, and GEMM) is defined using T* to access input buffers and output buffers. As known, "*" is a dereference operator indicating that a given variable is a pointer. A variable that stores the address of another variable is called a pointer. A pointer may be used to directly access the variable to which the pointer points using the dereference operator.

| Listing 7 |
|---|
| template <size_t n, typename T><br>void relu(T* __restrict in, T* __restrict out);<br>template<unsigned m0, unsigned n0, unsigned tm, unsigned tn, typename TA,<br>typename TB, typename TC><br>__attribute__((noinline))<br>void bias_add(TA* __restrict lhs, TB* __restrict rht, TC* __restrict out);<br>template <unsigned m0, unsigned k0, unsigned n0, unsigned tm, unsigned tk,<br>unsigned tn, unsigned tdm, unsigned tdn, typenam TR><br>__attribute__((noinline))<br>void mmul_8b_double_buffer_acc_store(const v32int8* __restrict pA,<br>const v64int8*<br>__restrict pB, TR* acc_buf, v32int8* __restrict out, const int is_init, ocnst<br>int shift_val); |

Since each kernel in a particular reconfigurable neural engine 100 implementation resides in a same core (i.e., in the case of a data processing array implementation), such kernels may utilize one or more shared buffers to communicate data to one another. The example source code of Listing 8 illustrates a scenario in which virtual machine 102 may be hard coded to implement a particular data flow. In the example of Listing 8, virtual machine 102 is hard coded to provide output from the GEMM kernel, which is stored in the accumulation buffer, to the BiasAdd kernel as an input. The example of Listing 8 may be used, for example, in the case where the instructions are implemented or formatted as static instructions.

| Listing 8 |
|---|
| int32 acc_buf[TM * M_ZERO * TN * N_ZERO] = {0};<br>...<br>if(stage_comp ++ GEMM)<br>  mmult_8b_double_buffer<m0, k0, n0, tm, tk, tn, tdm, tdn,<br>  v32acc32>(A_in, B_in,<br>(v32acc32*) acc_buf, is_init);<br>if(stage_comp == BIAS_ADD)<br>  bias_add<m0, n0, tm, tn, int32, int8, int8>((int32*) acc_buf, (int8*)<br>  A_in, (int8*)<br>Cbuf); |

In the case where dynamic instructions are used, data flows may be specified at runtime and, as such, need not be hard coded in virtual machine 102. Listing 9 illustrates example dynamic instructions that specify a data flow implemented as runtime through execution of the instructions by virtual machine 102. In the example, the GEMM kernel outputs data to the accumulation buffer and that the BiasAdd kernel takes, as input, the accumulation buffer and buffer A.

Listing 9

```
1    OP: [00] -> GEMM
     IN: [1100] -> [A, B, ACC, C]
     OUT: [0010] -> [A, B, ACC, C]
2    OP: [02] -> BIAS_ADD
     IN: [1010] -> [A, B, ACC, C]
     OUT: [0001] -> [A, B, ACC, C]
```

In one or more example implementations, data stored in a designated output buffer such as buffer C may be output from reconfigurable neural engine 100 as output data 114, while data stored in other buffers such as an accumulation buffer or a scratch pad buffer is not output from reconfigurable neural engine 100. As an illustrative and non-limiting example, a GEMM kernel may iterate four times to complete a large matrix multiplication operation. Each iteration is specified by a different instruction. In that case, the GEMM kernel generates partial results at the end of each iteration. The partial results are consumed by the next iteration of the GEMM kernel. The is_init and is_wait configuration bits may be used to configure the GEMM kernel based on which iteration is executing. When is_init is true, the GEMM kernel is executing the first iteration and initializes the output memory to zero before storing partial results. In second and third iterations, the GEMM kernel reuses the partial results so the is_init bit is set to false. In the last iteration, the is wait bit is set in the instruction which causes the GEMM kernel to output the resulting data to a final location (e.g., as illustrated in the example of Listing 9).

In another aspect, instructions for a first kernel and a second kernel (e.g., two different kernels) can be merged into the same opcode for those cases where the second kernel is always executed after the first kernel. Fusing allows the kernels to be fused into a single monolithic kernel and eliminates the need to provide a separate instruction for each of the two kernels. This reduces the overhead of virtual machine 102. An example of fusing an instruction for the GEMM kernel with the instruction of the BiasAdd kernel is illustrated in the example of Listing 10.

Listing 10

```
int32 acc_buf[TM * M_ZERO * TN * N_ZERO] = {0};
...
if(stage_comp == GEMM_BIAS_ADD)
    mmult_8b_double_buffer<m0, k0, n0, tm, tk, tn, tdm, tdn,
    v32acc32>(A_in, B_in,
    (v32acc32*) acc_buf, is_init);
    bias_add<m0, n0, tm, tn, int32, int8, int8>((int32*) acc_buf, (int8*),
    A_in, (int8*)
Cbuf);
```

While the examples described within this disclosure are illustrated for a single instance (e.g., a single compute tile), it should be appreciated that reconfigurable neural engine 100 may be scaled so that there are multiple implementations or instances of reconfigurable neural engine 100. Each implementation or instance of reconfigurable neural engine 100 may be implemented in a different compute tile or in other circuitry as described herein in greater detail below.

FIG. 7 illustrates an example architecture for an IC 700 that is capable of implementing one or more instances of reconfigurable neural engine 100. IC 700 is an example of an adaptive system. IC 700 is also an example of a programmable IC. IC 700 is also illustrative of a System-on-Chip (SoC).

In the example of FIG. 7, IC 700 is implemented on a single die provided within a single integrated package. In other examples, IC 700 may be implemented using a plurality of interconnected dies where the various programmable circuit resources illustrated in FIG. 7 are implemented across the different interconnected dies.

IC 700 includes a data processing array 702, programmable circuitry 704, a processor system 706, a Network-on-Chip (NoC) 708, and one or more hardwired circuit blocks 712. It should be appreciated that the architecture of IC 700 is provided for purposes of illustration and not limitation. An IC for use with the inventive arrangements described herein may include certain subsystems described herein in isolation (e.g., individually) or any of a variety of combinations of the subsystems described herein. For example, an IC may include one or more processors. In another example, the IC may include one or more processors (e.g., processor system 706) in combination with programmable circuitry 704. In another example, the IC may include one or more processors (e.g., processor system 706) in combination with a processor array such as data processing array 702. In other examples, IC 700 may include only a data processing array 702 or only programmable circuitry 704.

Data processing array 702 is implemented as a plurality of interconnected and programmable compute tiles 716. The term "tile," as used herein in connection with FIG. 7, means a circuit block. Compute tiles 716 may be arranged in an array and are hardwired. Each compute tile 716 can include one or more cores 718 and a memory circuit (abbreviated "Mem" in FIG. 7) 720. In one aspect, each core 718 is capable of executing program code stored in a core-specific program memory contained within each respective core (illustrated in FIG. 8). In one aspect, each core 718 may be implemented as one or more processors capable of executing computer-readable instructions.

In one or more examples, each core 718 is capable of directly accessing the memory circuit 720 within the same compute tile 716 and the memory circuit 720 of any other compute tile 716 that is adjacent to the core 718 of the compute tile 716 in the up, down, left, and/or right directions. For example, core 718-5 is capable of directly reading and/or writing (e.g., via respective memory interfaces not shown) memory circuits 720-5, 720-8, 720-6, and 720-2. Core 718-5 sees each of memory circuits 720-5, 720-8, 720-6, and 720-2 as a unified region of memory (e.g., as a part of the local memory accessible to core 718-5). This facilitates data sharing among different compute tiles 716 in data processing array 702. In other examples, core 718-5 may be directly connected to memory circuits 720 in other compute tiles.

Compute tiles 716 are interconnected by programmable interconnect circuitry. The programmable interconnect circuitry may include one or more different and independent networks. For example, the programmable interconnect circuitry may include a streaming network formed of streaming connections (shaded arrows) and a memory-mapped network formed of memory-mapped connections (unshaded arrows).

Cores 718 may be directly connected with adjacent cores 718 via core-to-core cascade connections. In one aspect, core-to-core cascade connections are unidirectional and direct connections between cores 718 as pictured. In another aspect, core-to-core cascade connections are bidirectional and direct connections between cores 718. In general, core-to-core cascade connections generally allow the results stored in an accumulation register of a source core 718 to be provided directly to an input of a target or load core 718 without traversing the programmable interconnects and/or being written by a first core 718 to a memory circuit 720 to be read by a different core 718.

In an example implementation, compute tiles 716 do not include cache memories. By omitting cache memories, data processing 702 is capable of achieving predictable, e.g., deterministic, performance. Further, significant processing overhead is avoided since maintaining coherency among cache memories located in different compute tiles 716 is not required. In a further example, cores 718 do not have input interrupts. Thus, cores 718 are capable of operating uninterrupted. Omitting input interrupts to cores 718 also allows data processing array 702 to achieve predictable, e.g., deterministic, performance.

In one or more other example implementations, data processing array 702 may include one or more memory tiles (not shown). A memory tile is characterized by the inclusion of a memory, a direct memory access (DMA) engine, and a stream switch that couples to other stream switches in adjacent tiles. A memory tile may be read and/or written by any compute tile in data processing array 702. A memory tile is further characterized by the lack of computational capabilities. That is, while a compute tile includes a core 718, a memory tile does not. In one aspect, memory circuits 720 may represent level 1 caches while the memory tiles represent level 2 caches for the data processing array 702.

Interface block 722 operates as an interface that connects compute tiles 716 to other resources of IC 700. In the example of FIG. 7, interface block 722 includes a plurality of interconnected interface tiles 724 organized in a row. Interface tiles 724 are connected so that data may be propagated from one interface tile to another bi-directionally. Each interface tile 724 is capable of operating as an interface for the column of compute tiles 716 (and/or memory tiles) directly above and is capable of interfacing such compute tiles 716 (and/or memory tiles) with components and/or subsystems of IC 700 including, but not limited to, programmable circuitry 704 and/or NoC 708.

Programmable circuitry 704 is circuitry that may be programmed to perform specified functions. Programmable circuitry 704 may be implemented as or include programmable logic. As an example, programmable circuitry 704 may be implemented as field-programmable gate array type of circuitry. Programmable circuitry 704 can include an array of programmable circuit blocks. As defined herein, the term "programmable circuitry" means circuitry used to build reconfigurable digital circuits. The reconfigurable digital circuits may be user-defined. Programmable circuitry 704 is formed of many programmable circuit blocks that provide basic functionality. The topology of programmable circuitry 704 is highly configurable unlike hardwired circuitry. Each programmable circuit block of programmable circuitry 704 typically includes a programmable element 726 (e.g., a functional element) and a programmable interconnect 742. The programmable interconnects 742 provide the highly configurable topology of programmable circuitry 704. The programmable interconnects 742 may be configured on a per wire basis to provide connectivity among the programmable elements 726 of programmable circuit blocks of programmable circuitry 704 and is configurable on a per-bit basis (e.g., where each wire conveys a single bit of information) unlike connectivity among compute tiles 716, for example, that may include multi-bit stream connections capable of supporting packet-based communications.

Processor system 706 is implemented as hardwired circuitry that is fabricated as part of IC 700. Processor system 706 may be implemented as, or include, any of a variety of different processor (e.g., central processing unit) types each capable of executing computer-readable instructions. For example, processor system 706 may be implemented as one or more processors. Each processor may include one or more cores. Each processor and/or core is capable of executing computer-readable instructions. In still another example, processor system 706 may include one or more processors, cores, modules, co-processors, I/O interfaces, and/or other resources. Processor system 706 may be implemented using any of a variety of different types of architectures. Example architectures that may be used to implement processors and/or cores of processor system 706 may include, but are not limited to, a Complex Instruction Set Computer (CISC) architecture, a Reduced Instruction Set Computer (RISC) architecture, a vector processing architecture, or other known architecture. Example processors include, but are not limited to, processors having an x86 type of architecture (IA-32, IA-64, etc.), Power Architecture, ARM processors, and the like. In one or more example implementations, processor system 706 may execute a control program that controls execution of an application (e.g., one or more kernels) within data processing array 702.

NoC 708 is a programmable interconnecting network for sharing data between endpoint circuits in IC 700. The endpoint circuits can be disposed in data processing array 702, programmable circuitry 704, processor system 706, and/or selected hardwired circuit blocks 712. NoC 708 can include high-speed data paths with dedicated switching. In an example, NoC 708 includes one or more horizontal paths, one or more vertical paths, or both horizontal and vertical path(s). The arrangement and number of regions shown in FIG. 7 is merely an example. NoC 708 is an example of the common infrastructure that is available within IC 700 to connect selected components and/or subsystems.

Within NoC 708, the nets that are to be routed through NoC 708 are unknown until a user circuit design is created for implementation within IC 700. NoC 708 may be programmed by loading configuration data into internal configuration registers that define how elements within NoC 708 such as switches and interfaces are configured and operate to pass data from switch to switch and among the NoC interfaces to connect the endpoint circuits. NoC 708 is fabricated as part of IC 700 (e.g., is hardwired) and, while not physically modifiable, may be programmed to establish connectivity between different master circuits and different slave circuits of a user circuit design. In one aspect, NoC 708, upon power-on, does not implement any application data paths (e.g., routes) therein, but may provide default paths for loading configuration data into selected other subsystems. Once configured, however, NoC 708 implements data paths or routes between endpoint circuits.

Hardwired circuit blocks 712 include special-purpose circuit blocks fabricated as part of IC 700. Though hardwired, hardwired circuit blocks 712 may be configured by loading configuration data into control registers to implement one or more different modes of operation. Examples of hardwired circuit blocks 712 may include input/output (I/O) blocks, transceivers for sending and receiving signals to circuits and/or systems external to IC 700, memory controllers, or the like. Examples of different I/O blocks may include single-ended and pseudo differential I/Os. Examples of transceivers may include high-speed differentially clocked transceivers. Other examples of hardwired circuit blocks 712 include, but are not limited to, cryptographic engines, digital-to-analog converters (DACs), analog-todigital converters (ADCs), and the like. In general, hardwired circuit blocks 712 are application-specific circuit blocks.

In one or more other examples, hardwired circuit blocks 712 may include a RAM, e.g., one or more banks of RAM. As an example, the RAM may be a Double Data Rate (DDR) Synchronous Dynamic RAM. In still another example, hardware circuit blocks 712 may include a High-Bandwidth Memory (HBM).

The various programmable circuit resources illustrated in FIG. 7 may be programmed initially as part of a boot process for IC 700. During runtime, the programmable circuit resources may be reconfigured. At any point during runtime, all or a portion of IC 700 may be reconfigured. In some cases, processor system 706 or another processing system disposed in IC 700 may configure and/or reconfigure programmable logic 704 and/or NoC 708.

Figure 8:
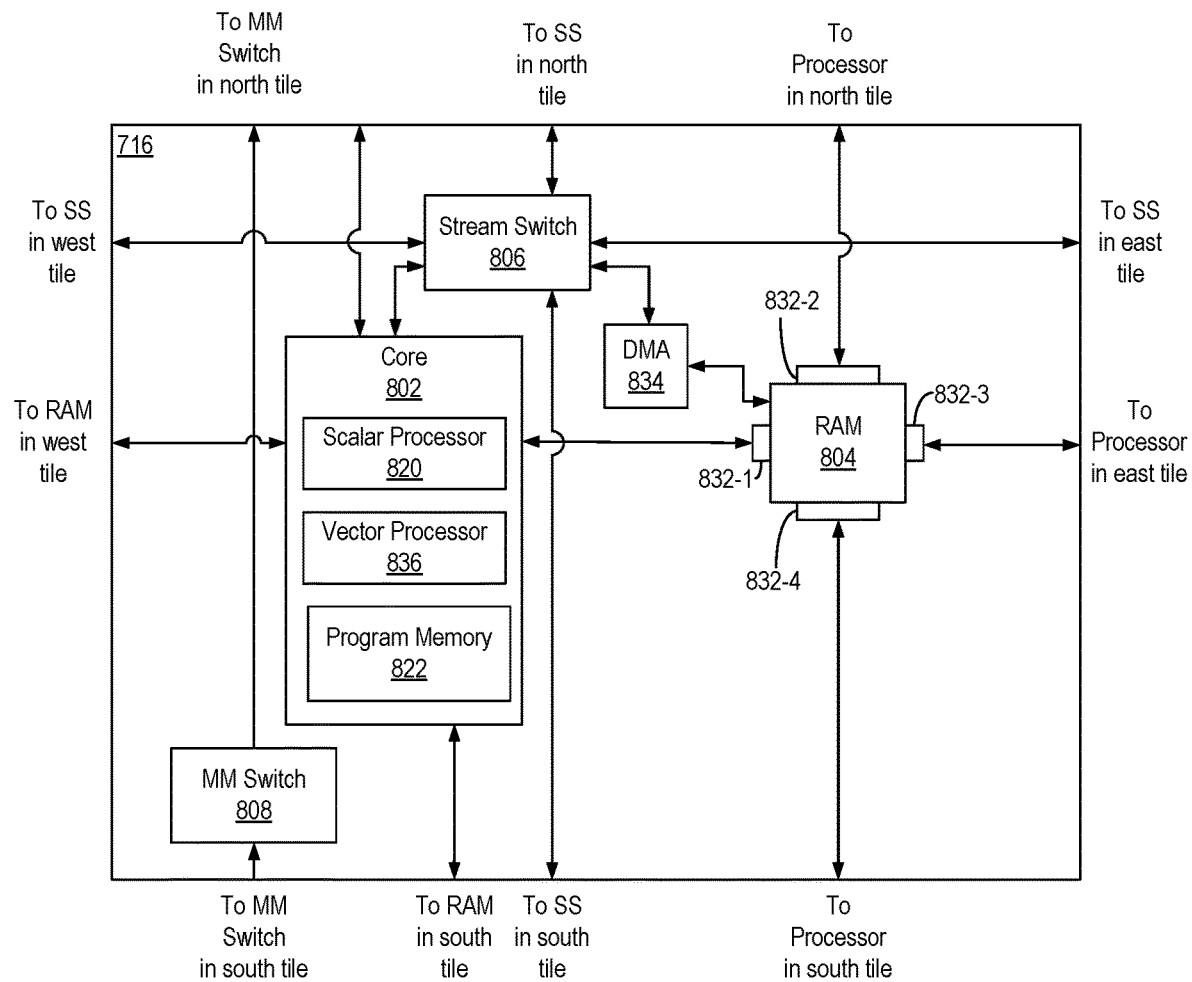
FIG. 8 illustrates an example of a compute tile of a data processing array that is capable of implementing an instance of a reconfigurable neural engine.

FIG. 8 illustrates an example implementation of a compute tile 716 of FIG. 7. The example of FIG. 8 is provided to illustrate certain architectural features of compute tiles 716 and not as a limitation of the form of data processing array 702. Some connections between components and/or tiles are omitted for ease of illustration.

In the example, each compute tile 716 includes a core 802, a random-access memory (RAM) 804, a stream switch 806, and a memory map (MM) switch 808. Core 802 incudes a scalar processor 820, a vector processor 836, and a program memory 822. Compute tile 716 further may include a set of control registers (not shown) that may be written by memory mapped switch 808 to control operation of the various components included in compute tile 716. Program memory 822 may be loaded, e.g., by way of loading configuration data, with one or more sets of computer-readable (e.g., executable) instructions called "kernels" and virtual machine 102. Compute tiles 716 are capable of performing data processing operations and operating on a large amount of data through execution of the kernels.

Each core 802 may be directly connected to the RAM 804 located in the same compute tile 716 through a memory interface 832 (e.g., local memory interface 832-1). Within this disclosure, memory interface such as 832-1 are referred to as "local memory interfaces" since the memory interfaces are used by circuits in the same tile to access a RAM. By comparison, memory interfaces 832-2, 832-3, and 832-4 are referred to as "adjacent memory interfaces" as such memory interfaces are used by circuitry in another adjacent tile to access a RAM. As such, each core 802 is capable of accessing RAM 804 in the same compute tile 716. Core 802 (e.g., scalar processor 820 and/or vector processor 836) is capable of executing program code stored in program memory 822. RAM 804 is configured to store application data. RAM 804 may be updated or written via MM switch 808 and/or stream switch 806. Though not illustrated, MM switch 808 may be coupled to any memory, including control registers, located in compute tile 716 so that such memory may be read or written. Each of RAMs 804 may include a direct memory access (DMA) circuit 834 that is capable of reading and writing data to the RAM 804 located in the same compute tile 716. The DMA circuit 834 may receive data via stream switch 806 and store such data in RAM 804 and/or output data read from RAM 804 over stream switch 806.

Each core 802 may be directly connected to RAM 804 located in adjacent compute tiles 716 (e.g., in the north, south, east, and/or west directions). As such, core 802 may directly access such other adjacent RAMs 804 in the same manner as core 802 is able to access the RAM 804 located in the same compute tile 716 without initiating read or write transactions over stream switch 806 and/or without using a DMA circuit. As an illustrative example, core 802 of compute tile 716-5 may read and/or write to the RAM 804 located in compute tiles 716-5, 716-2, 716-4, and 716-6 without submitting read or write transactions over stream switches 806. It should be appreciated, however, that a core may initiate read and write transactions to the RAM 804 of any other compute tile 716 and/or memory tile via stream switches 806.

Cores 802 may also have direct connections, referred to as cascade connections (not shown), to other ones of cores 802 located in adjacent compute tiles (e.g., in the north, south, east, and/or west directions) that allow direct sharing of data stored in internal registers (e.g., an accumulation register) of core 802 (e.g., of processor 820 and/or vector processor 836) with other cores 802 without first writing such data to RAM 804 and/or conveying such data over stream switches 806.

Referring to the example of FIGS. 7 and 8, one or more reconfigurable neural engine 100 implementations may be implemented IC 700. In one or more example implementations, one or more instances and/or implementations of reconfigurable neural engine 100 may be implemented in different ones of compute tiles 716. For example, different kernels and the virtual machine 102 may be stored in program memory 822. The various buffers illustrated in the examples of FIGS. 4, 5, and/or 6 may be stored in RAM 804. Scalar processor 820 may execute virtual machine 102 while vector processor 836 executes the various kernels under control of virtual machine 102 as executed by the scalar processor 820.

In another example implementation, one or more reconfigurable neural engine 100 instances and/or implementations may be implemented entirely in programmable circuitry 704. Virtual machine 102 may be implemented in programmable circuitry 704 as a state machine (e.g., in circuitry) or as a soft-processor (that executes computer-readable instructions) while the kernels coupled to virtual machine 102 are also implemented in programmable circuitry 704.

In another example implementation, processor system 706 may execute one or more instances of a virtual machine 102 (e.g., implemented as computer-readable instructions) that couples to respective kernels implemented in programmable circuitry 704.

In another example implementation, processor system 106 may execute one or more instances and/or implementations of reconfigurable neural engine 100.

In one or more example implementations, the entity that provides instructions to each reconfigurable neural engine 100 instance and/or implementation may be implemented as a controller in programmable circuitry 704, as a processor of processor system 706, or as an external processor (e.g., of a data processing system communicatively linked to IC 700).

Figure 9:
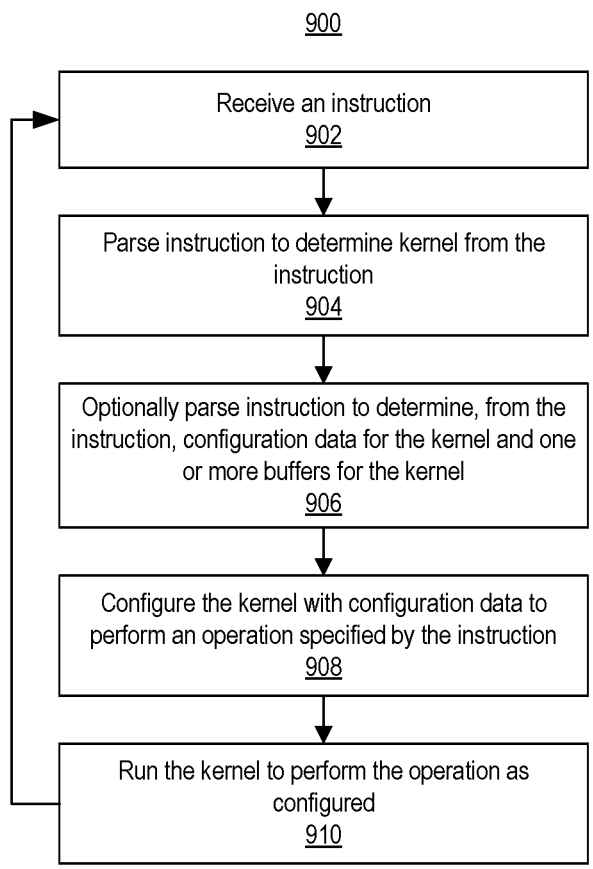
FIG. 9 illustrates an example method of operation of a reconfigurable neural engine.

FIG. 9 illustrates an example method 900 of operation of a reconfigurable neural engine 100 including a virtual machine 102. The virtual machine 102 may be run on electronic hardware as described within this disclosure. Method 900 illustrates runtime operation of reconfigurable neural engine 100.

In block 902, the virtual machine 102 receives an instruction. More particularly, virtual machine 102 receives an instruction from an entity that implements a higher-level framework. In the case where reconfigurable neural engine 100 is implemented in a compute tile 716, the instruction may be received over the stream connections.

In block 904, the virtual machine 102 is capable of parsing the instruction to determine a selected (e.g., a first) kernel from a plurality of kernels coupled to the virtual machine. The plurality of kernels are part of reconfigurable neural engine 100.

In block 906, the virtual machine optionally parses the instruction to determine (e.g., extract) configuration data from the instruction. The virtual machine may also parse the instruction to determine one or more buffers to be used by the selected kernel. For example, the instruction may specify one or more buffers that store data to be used as input to the selected kernel to perform an operation. The instruction may also specify a buffer in which the selected kernel is to store generated data. In one aspect, block 906 reflects operations that may be performed by virtual machine 102 in response to receiving an instruction with a dynamic instruction format as illustrated in the example of FIG. 3.

In one or more other example implementations, virtual machine 102 may be pre-programmed (e.g., hard coded) with configuration data to be used for the selected kernel and/or particular buffer(s) to be used to provide input and/or store output for the selected kernel. In this example, the instruction that is received may have a static format as illustrated in the example of FIG. 2.

In block 908, the virtual machine 102 configures the selected kernel with the configuration data to perform an operation specified by the instruction. As discussed, the configuration data may specify one or more buffers containing input data for the first kernel and a buffer to store data generated by the first kernel.

In block 910, the virtual machine 102 runs the selected kernel to perform the operation as configured.

After block 910, method 900 may loop back to block 902 to continue processing data. In one or more example implementations, one or more buffers used by the selected kernel may be repurposed for use by a different kernel in the case where the selected kernel is finished using the buffer. The repurposing may be performed prior to the kernel completing execution so long as the data from the repurposed memory (e.g., region of memory) is no longer needed by the executing kernel.

Accordingly, in one or more examples, the virtual machine 102 may receive and parse a further (e.g., second) instruction to determine a different (e.g., a second) kernel from the plurality of kernels. The virtual machine 102 is capable of configuring the different kernel to share data with the selected kernel by using at least one selected buffer that was also used by the selected kernel.

For example, the at least one selected buffer may be one or more buffers configured to store data used as input for the first kernel or a buffer configured to store results generated by the first kernel.

In another example, the different (e.g., second) kernel is configured to obtain input data from the at least one selected buffer.

In one or more examples, the first instruction and the second instruction form a fused instruction.

In one or more examples, the virtual machine 102 is capable of parsing the different (e.g., second) instruction to extract the configuration data from the second instruction and to determine, from the second instruction, the at least one buffer to be used by the second instruction.

The virtual machine 102 is capable of running the different (e.g., second) kernel to perform an operation as configured.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores computer-readable instructions (e.g., program code) for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of example computer-readable storage media includes an electronic storage device, a magnetic storage device, an optical storage device, an electromagnetic storage device, a semiconductor storage device, or any suitable combination of the foregoing. A non-exhaustive list of more specific examples of computer-readable storage media includes: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "soft" in reference to a circuit means that the circuit is implemented in programmable logic or programmable circuitry. Thus, a "soft processor" means at least one circuit implemented in programmable circuitry that is capable of carrying out instructions embodied as program instructions.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The flowchart and block diagrams in the Figures illustrate the architecture, functionality, and operation of possible implementations of systems and methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. An integrated circuit, comprising:
    a plurality of kernels, wherein each kernel of the plurality of kernels is configured to perform a machine learning function;
    a virtual machine coupled to the plurality of kernels;
    wherein the plurality of kernels and the virtual machine run on hardware resources of the integrated circuit; and
    wherein the virtual machine is configured to interpret instructions directed to different ones of the plurality of kernels and control operation of the different ones of the plurality of kernels responsive to the instructions.

2. The integrated circuit of claim 1, wherein
    the virtual machine is executed by a first processor; and
    the plurality of kernels are executed by a second processor.

3. The integrated circuit of claim 2, wherein
    the first processor is a scalar processor disposed in a compute tile of a data processing array; and
    the second processor is a vector processor disposed in the compute tile of the data processing array.

4. The integrated circuit of claim 1, wherein
    the virtual machine is implemented in programmable logic; and
    one or more of the plurality of kernels is implemented in the programmable logic.

5. The integrated circuit of claim 1, wherein, for a selected instruction received, the virtual machine is configured to determine a selected kernel of the plurality of kernels indicated by an opcode of the instruction, configure the selected kernel to operate in a selected mode of operation selected from a plurality of modes of operation, and run the selected kernel.

6. The integrated circuit of claim 1, wherein the virtual machine uses a static instruction format in which each instruction has a fixed length and includes same fields.

7. The integrated circuit of claim 5, wherein the selected mode of operation is specified by the selected instruction.

8. The integrated circuit of claim 1, wherein the virtual machine uses a dynamic instruction format in which each instruction is formed of kernel-specific configuration and data fields.

9. The integrated circuit of claim 8, wherein the virtual machine manages local memory used by the plurality of kernels responsive to the instructions based on a memory map maintained by the virtual machine, wherein the memory map indicates which regions of the local memory are available for reuse.

10. The integrated circuit of claim 1, wherein for a selected instruction the virtual machine is configured to,
    parse the selected instruction to determine a selected kernel from the plurality of kernels to which the selected instruction is directed.

11. The integrated circuit of claim 10, wherein the virtual machine is configured to parse the selected instruction to determine configuration data for the selected kernel.

12. The integrated circuit of claim 10, wherein the virtual machine is configured to parse the selected instruction to determine at least one of a buffer containing input data or a buffer to which data generated by the selected kernel is stored.

13. A method, comprising:
    receiving, by a virtual machine running on electronic hardware, a first instruction;
    parsing, using the virtual machine, the first instruction to determine a first kernel from a plurality of kernels coupled to the virtual machine;
    wherein each kernel of the plurality of kernels is configured to perform a machine learning function and runs on the electronic hardware;
    configuring, using the virtual machine, the first kernel with configuration data to implement a selected mode of operation selected from a plurality of modes of operation to perform a selected machine learning function corresponding to the first kernel;
    wherein the configuration data specifies a buffer containing input data for the first kernel and a buffer to store data generated by the first kernel; and running, by the virtual machine, the first kernel in the selected mode of operation to perform the selected machine learning function as configured.

14. The method of claim 13, further comprising:

parsing the first instruction to extract the configuration data from the first instruction; and parsing the first instruction to determine one or more of the buffers to be used by the first kernel.

15. The method of claim 13, further comprising:

receiving and parsing a second instruction to determine a second kernel from the plurality of kernels; and configuring the second kernel to share data with the first kernel by using at least one selected buffer that was also used by the first kernel.

16. The method of claim 15, wherein the first instruction and the second instruction form a fused instruction.

17. The method of claim 15, wherein the at least one selected buffer stores data used as input for the first kernel or stores results generated by the first kernel.

18. The method of claim 17, wherein the second kernel is configured to obtain input data from the at least one selected buffer.

19. The method of claim 15, further comprising:

parsing the second instruction to extract configuration data from the second instruction and to determine, from the second instruction, the at least one selected buffer to be used by the second instruction.

20. The method of claim 15, further comprising:

running the second kernel to perform an operation as configured.

* * * * *